Jan. 10, 1939.                R. V. KLEINSCHMIDT                2,143,015
        PACKING MATERIAL FOR FRACTIONATING AND SCRUBBING TOWERS
                    Original Filed May 28, 1935    5 Sheets-Sheet 5
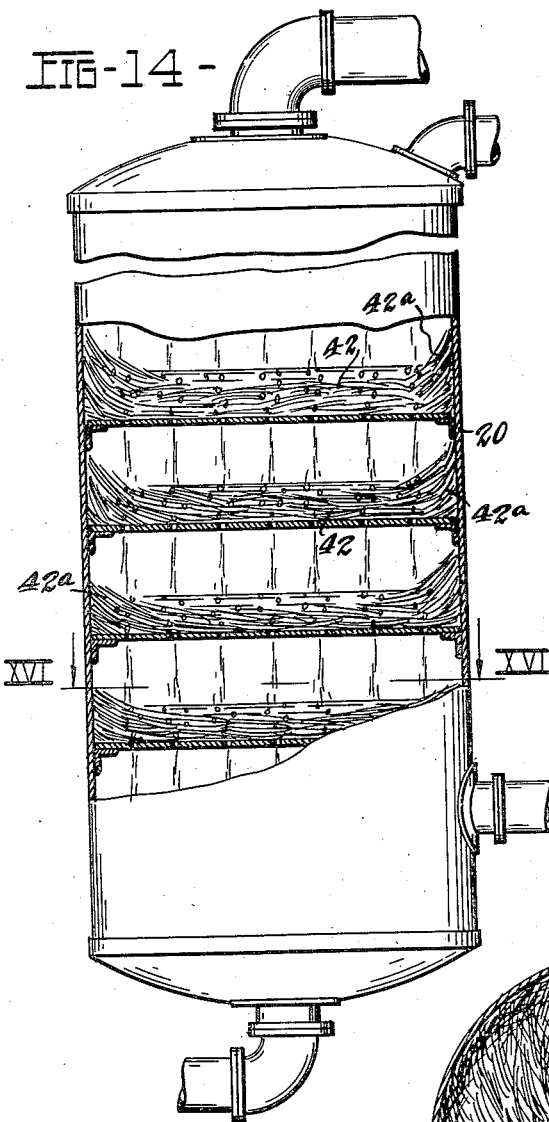
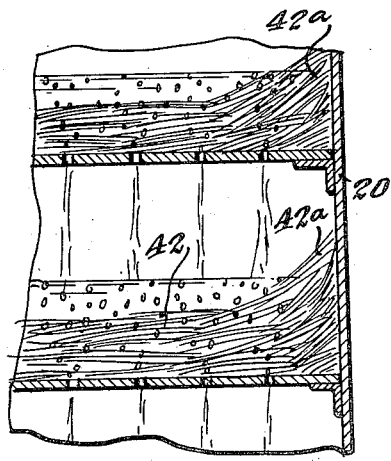
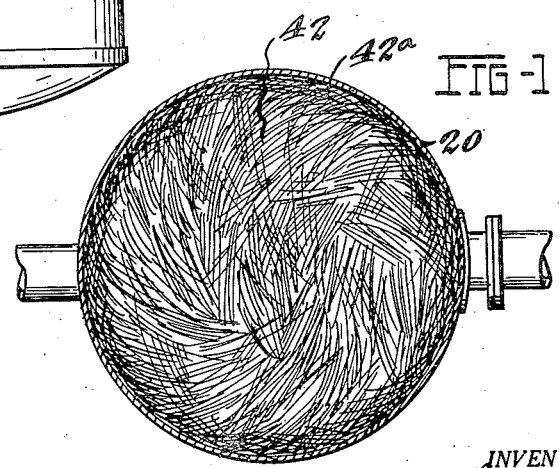
INVENTOR.
Robert V. Kleinschmidt
BY
J. F. Rule ATTORNEY.

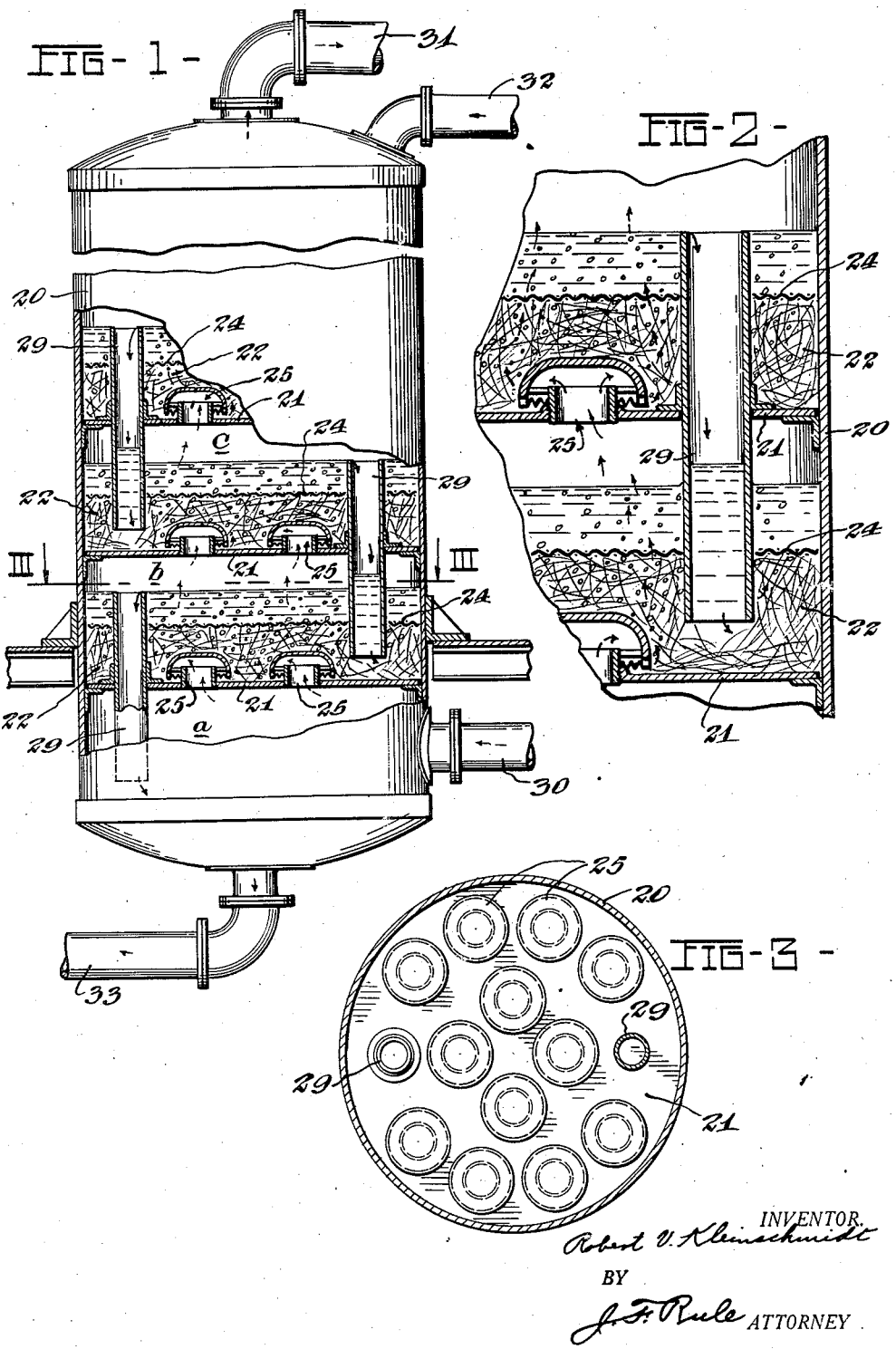

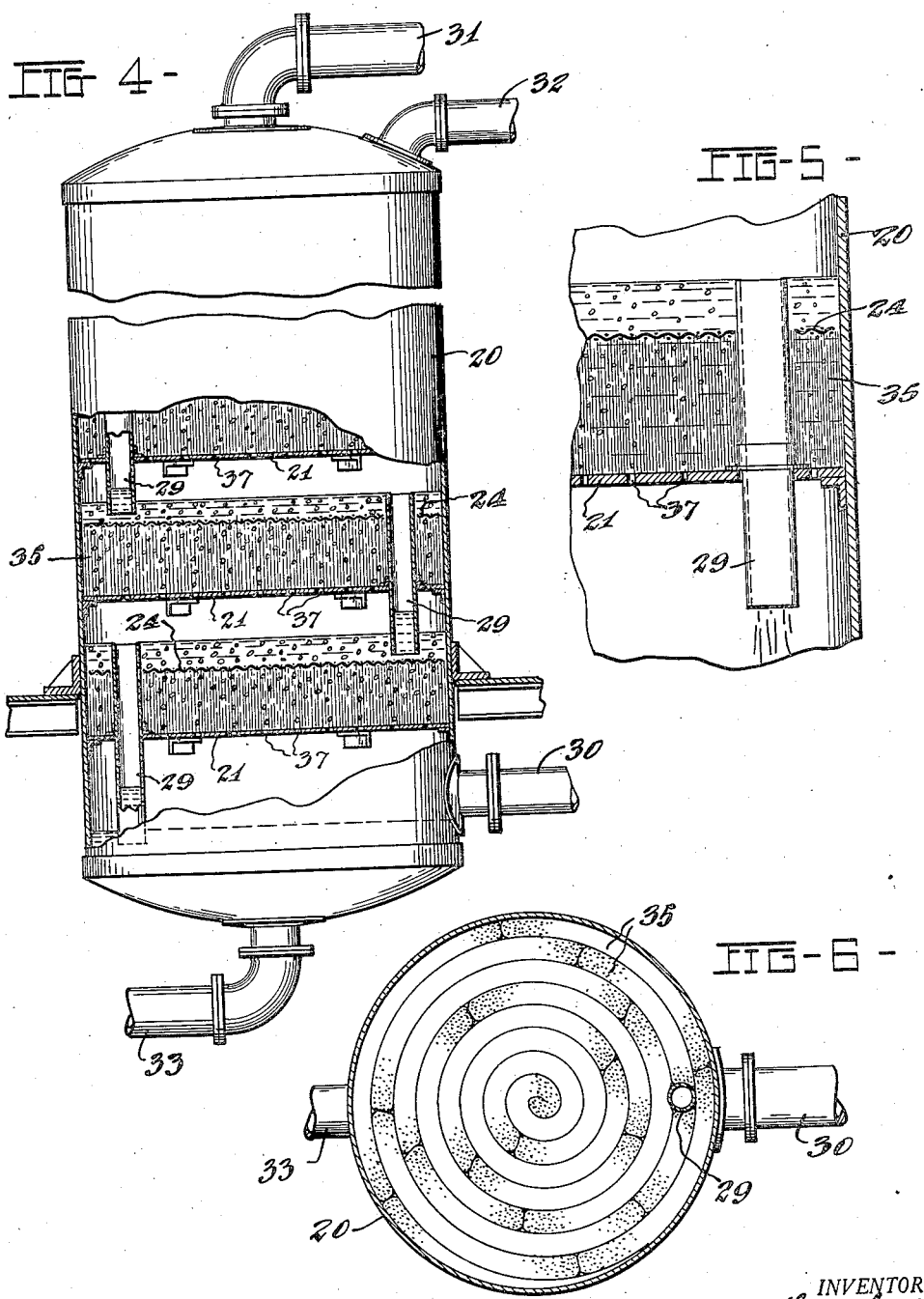

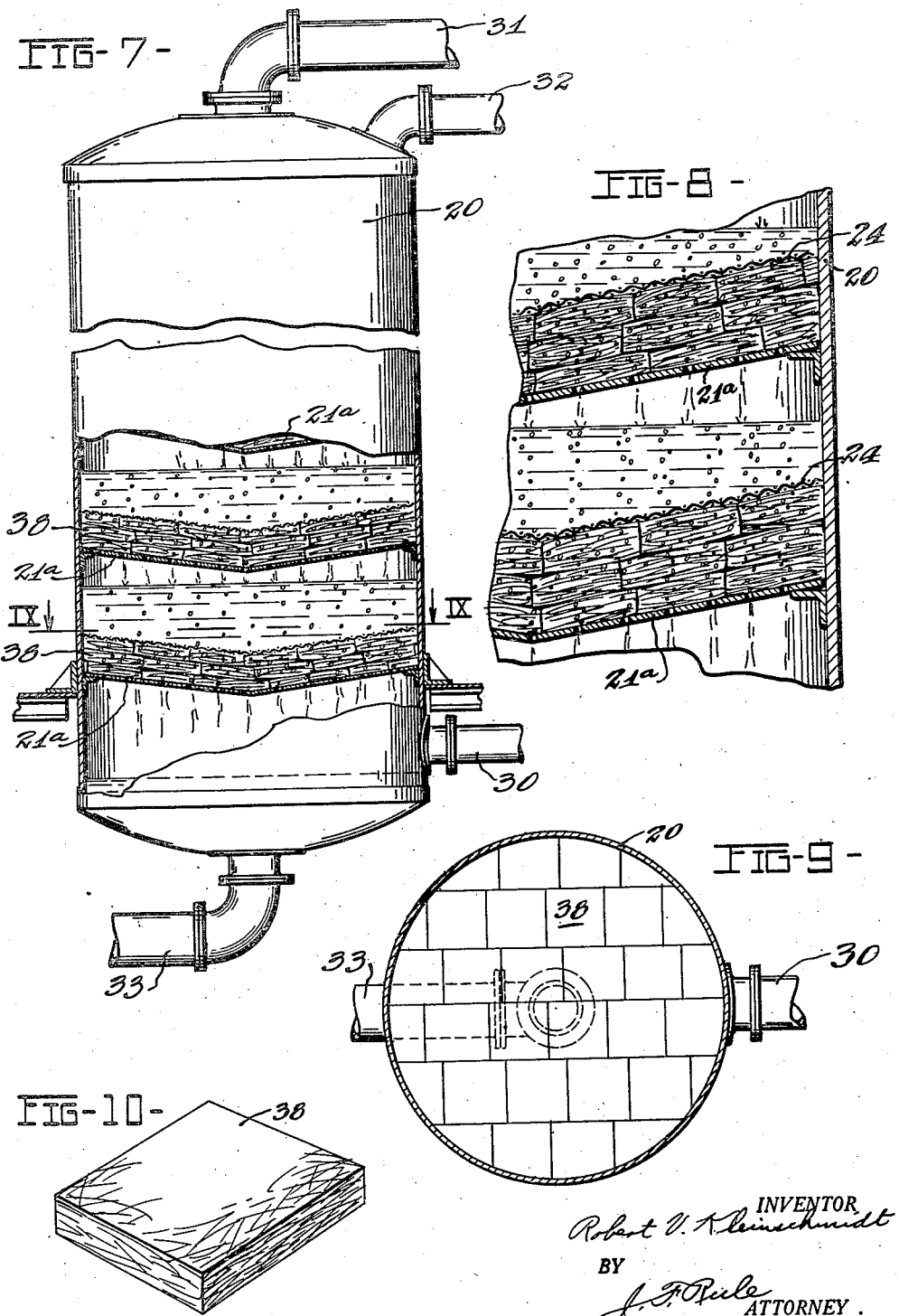

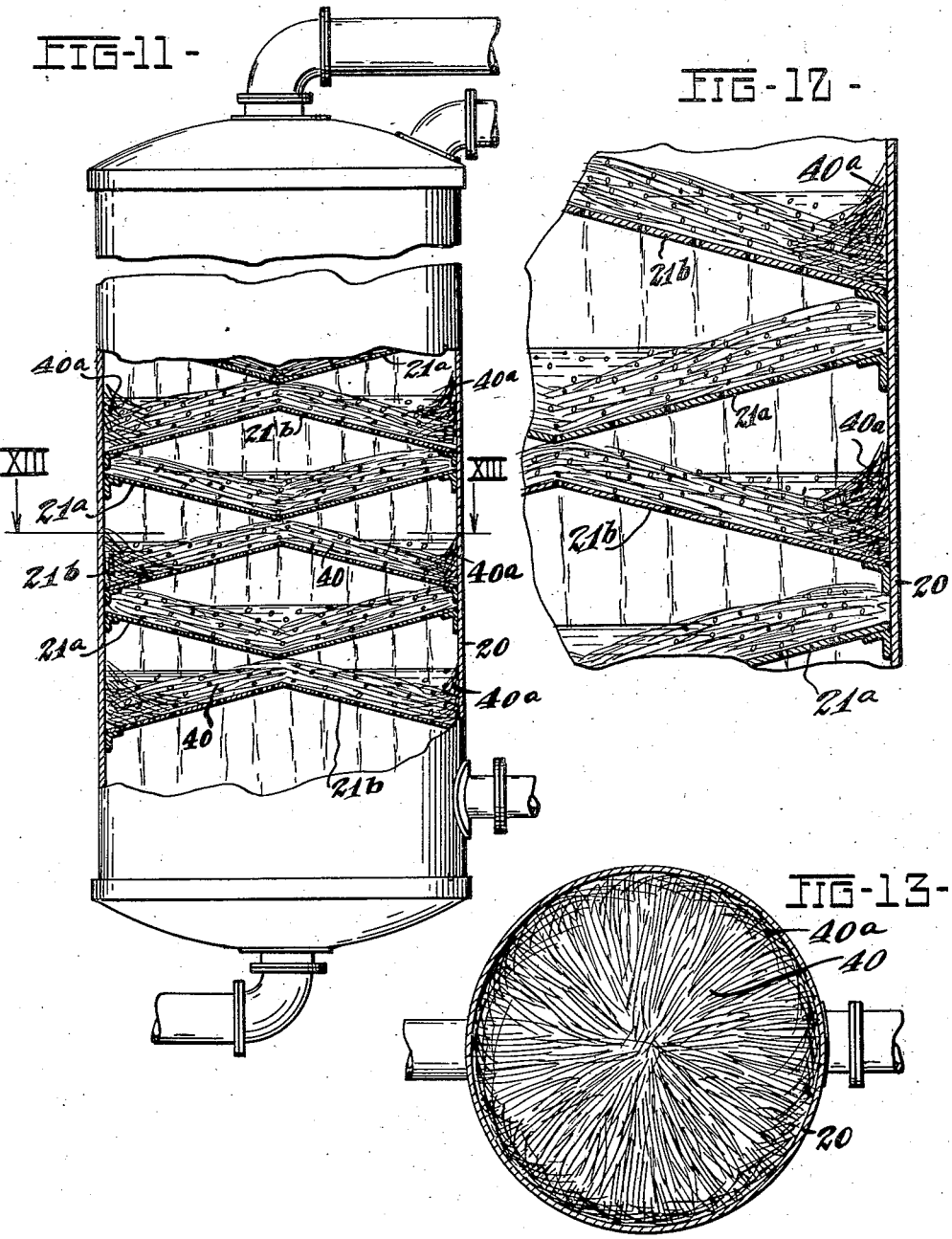

Patented Jan. 10, 1939

2,143,015

UNITED STATES PATENT OFFICE 2,143,015

PACKING MATERIAL FOR FRACTIONATING AND SCRUBBING TOWERS

Robert V. Kleinschmidt, Stoneham, Mass., assignor to Arthur D. Little, Inc., a corporation of Massachusetts Application May 28, 1935, Serial No. 23,894
Renewed May 9, 1938

18 Claims. (Cl. 261—96)

This invention relates to the use of glass fibers as packing material for scrubbing towers and fractionating or rectifying towers and related uses.

The function of such equipment is to provide a structure over which a liquid may flow in such a manner as to present a large area of contact with gases or vapors which flow, usually in countercurrent to the liquid, through the interstices of the packing material. In addition to providing an extended area of surface, the packing material provides a means for controlling the rate of flow and hence the time of contact of the liquid with the gaseous medium.

So far as the function of the packing material is concerned, scrubbing towers and fractionating towers are identical in their action, the only difference being that in the fractionating towers the gaseous medium consists of material vaporized from and recondensing in the stream of liquid. This vaporization and recondensation of substantial portions of the liquid and gaseous streams introduces thermal effects that are of importance in fractionating towers while of negligible magnitude in many scrubbing operations. The thermal characteristics of the packing may therefore have to be taken into account to some extent in the case of fractionating column packing.

A major problem in the packing of large sized columns is to maintain a uniform flow of liquid and of vapor at all points across every cross section of the tower. It is well known that in large towers packed with the usual types of materials, such as coke or other broken material or with rings or other shapes of essentially granular material, distributed in a random manner in the tower, there is a tendency for the liquid to work to the sides of the tower and flow down rapidly along the inner shell of the tower, leaving the central portions almost dry. In the case of fibrous materials heretofore used for packing, it is found that it is difficult to obtain uniform resistance to flow over the cross section and there has been a tendency to develop channels due to uneven settling and "blowing out" of the material.

I have discovered these defects can be entirely eliminated and numerous other advantages hereinafter discussed can be attained by the use of a packing of fibers suitably arranged and of a proper size and density of packing for the particular problem involved. For most purposes a packing material composed of glass fibers possesses the advantage of ease of fabrication and chemical resistance.

The present invention comprises the use of a fibrous material of relatively open structure, the fibers of which are so arranged as to control the distribution of the liquid flow. For most purposes it is desirable that the liquid shall wet the surface of the fibers and I have found that by suitably arranging the fibers in horizontal or inclined planes or in vertical and circumferential directions, the wetted fibers may be caused to direct the motion of the fluid in any desired manner. In certain cases it may be desirable to prevent wetting of the fibers or the resulting flow along the fibers and in this case fibers waterproofed in any suitable manner, as for example, by coating with insoluble metal soaps, may be used. Such waterproofed fibers are particularly useful in various structures in conjunction with the wetted fibers.

I also find that the fineness and density of the wool to be used is dependent on the viscosity, surface tension and the wetting power of the liquid as well as on the permissible resistance to the flow of the gaseous medium. The convenience which glass wool possesses in this respect, I have found to be particularly useful in continuous fractionating columns where maximum efficiency can be obtained by the use of relatively coarse wool at the bottom of the column where heavy viscous liquids occur, and finer wool at the top where the light limpid liquids occur. There is also in certain fractionating columns a marked variation in the amount of vapor flowing in different parts of the column and this can be compensated for by the use of various fiber diameters and densities of packing.

The accompanying drawings illustrate several forms of apparatus adapted for use in practicing my invention and which will serve as examples of the application of the invention to specific problems. These examples will also serve to elucidate the important features of the method, which covers broadly the use of the directional properties of the fibers to control the flow of liquid and vapor in the tower.

Referring to the drawings:

Figs. 1 to 3, inclusive, illustrate one form of gas and liquid contact apparatus constructed in accordance with the present invention.

Fig. 1 is a part sectional elevation of the apparatus with parts broken away.

Fig. 2 is a fragmentary sectional elevation showing a portion of the apparatus on an enlarged scale.

Fig. 3 is a section at the line III—III on Fig. 1.

Figs. 4, 5 and 6 illustrate a modified construction.

Fig. 4 is a part sectional elevation of the apparatus.

Fig. 5 is a fragmentary section of a portion of the apparatus on a larger scale.

Fig. 6 is a sectional plan view.

Figs. 7 to 10, inclusive, illustrate a further modification.

Fig. 7 is a part sectional elevation.

Fig. 8 is a fragmentary section on a larger scale.

Fig. 9 is a section at the line IX—IX on Fig. 7.

Fig. 10 is a perspective view of a block of packing material.

Figs. 11 to 13 illustrate another form of the invention.

Fig. 11 is a part sectional elevation.

Fig. 12 is a fragmentary sectional view on a larger scale.

Fig. 13 is a section at the line XIII—XIII on Fig. 11.

Figs. 14 to 16 illustrate another modification.

Fig. 14 is a part sectional elevation.

Fig. 15 is a fragmentary sectional view.

Fig. 16 is a section at the line XVI—XVI on Fig. 14.

Figs. 1, 2 and 3 show a form of gas and liquid contact apparatus which is adapted for use as a fractionating and rectifying apparatus. The cylindrical tower 20 is divided into a plurality of superposed chambers or compartments a, b, c, etc., by means of horizontal partitions or platforms 21.

Supported on each platform 21 is a layer 22 of fibrous packing material. This material preferably consits of glass fibers which, as shown in Figs. 1 and 2, is in the form of a mat with the fibers extending promiscuously in all directions and interlaced, felted or matted in a manner to cause an even distribution of the liquids and vapors or gases passing therethrough. the matted form of the fibrous material also tends to prevent displacement of the material under the force of the fluids passing therethrough. That is, the glass fibers when in this matted form, resist the tendency to develop channels due to uneven settling and "blowing out" of the material.

Overlying each mat or layer 22 is a screen 24 by which the fibrous material is held in place and separated to a certain extent from the liquid which accumulates thereover. Each platform 21 is provided with bubble trays 25 which may be of any conventional or approved form. These bubble trays serve to spread the vapors passing upward therethrough, causing them to be broken up into small bubbles. These bubbles are further subdivided and evenly distributed by the fibrous material 22 as they pass upward therethrough, causing a large surface contact of the vapors with the fibers. The length of time the vapors are in contact with the liquid is also increased by the retarding and directing action of the fibers.

Extending vertically through each platform 21 and supported thereby is an overflow pipe 29 open at top and bottom. Each pipe extends upward a short distance above the mat and screen on the corresponding platform. The pipe also extends downward through the screen beneath the platform and has its lower end embedded in the mat 22 beneath the supporting platform.

The gases or vapors to be treated are introduced into the tower near its lower end, through an inlet pipe 30. The gases are discharged through an outlet pipe 31 at the top of the tower. If the apparatus is used as a scrubbing tower, water or other liquid may be introduced at the top of the tower through an inlet pipe 32 and discharged through a pipe 33 at the bottom of the tower.

Assuming the apparatus is used as a fractionating tower, the gases or vapors to be treated flow through the pipe 30 into the lowermost compartment a and pass upward through bubble trays 25 into the compartment b, the bubble trays serving to divide the gas into small bubbles and evenly distribute them, in the manner heretofore described. A certain portion of the vapors reaching the top of the tower are condensed to a liquid in any suitable apparatus (not shown) and this liquid is returned to the top of the tower through the reflux pipe 32, where it flows down from one chamber to another, contacting with the rising vapors. In each chamber, such as a, b and c, a certain portion of the heavier or higher boiling vapors are condensed and enter the liquid stream, and a certain portion of the lighter liquid materials are evaporated and join the rising stream of vapors. There is thus a continual exchange of latent heat and of liquid and gaseous components between the rising vapors and the descending liquid which results in the higher boiling components being carried to the bottom of the tower while the lower boiling components rise as vapors to the top of the tower.

Figs. 4 to 6 illustrate a modification in which the fibrous contact material is arranged in a substantially different manner from that shown in Figs. 1 and 2. As will be seen by reference to Fig. 6, the glass wool or fibrous material is made in the form of a strip or strips 35, wound spirally to form a cylindrical roll or mat of a size which will just slip into the shell of the tower which is to be packed. As shown, the spiral is comprised of a plurality of individual mats or strips 35 placed end to end, although, if preferred, a single continuous strip may be used to form the entire roll. The glass fibers comprising this roll preferably have a generally vertical and more or less circumferential direction.

Each platform or partition 21 is provided with a multiplicity of evenly distributed small openings 37 which permit the gases to pass upward in the form of small bubbles evenly distributed throughout the mass of contacting material 35. If the apparatus is used, for example, as a scrubbing tower, the gases or vapors to be treated enter the tower through the inlet pipe 30 and are discharged through the pipe 31. Water may be admitted through the pipe 32 at the top of the tower and discharged through the pipe 33 at the bottom of the tower.

The rate of flow of the liquid or the "hold-up" in the column can to a large extent be regulated and controlled by regulating the arrangement of the fibers. In order to counteract the tendency heretofore mentioned, of the liquid flow to work to the sides of the tower, leaving the central portions comparatively dry, which tendency is sometimes present when the fibers are laid down in the form of horizontal mats, the portions of the mat adjacent the wall of the tower may have the fibers arranged to extend mainly horizontally, while the general direction of the fibers comprising the central portion of the mat is more nearly vertical. If desired, the distribution of flow may be further controlled and rendered more uniform by making the peripheral portions of the mat more or less compact and/or of either finer or coarser individual fibers than those nearer the center.

Figs. 7 to 9 illustrate a form of apparatus in which the glass wool or fibrous material is laid in such a manner that the general direction of the material as a mass, as well as that of the individual fibers, is radially inward and downward toward the axis of the tower. The platforms or baffle plates 21ª which support the fibrous material are also arranged to extend in a correspondingly inclined direction. In other words, these supporting plates extend downwardly and inwardly from the walls of the tower to the vertical center line thereof in the form of an inverted cone. The glass wool may be supplied in the form of substantially rectangular bats or blocks 38 (Fig. 10). These may be compactly arranged in superposed layers with the individual bats parallel with the inclined support therebeneath. The bats 38 which extend along the walls of the tower may be cut to conform to the curvature of the walls. As the bats of glass wool are very resilient and compressible to a high degree, they may be compactly fitted together and also conform closely to the walls of the tower.

Figs. 11 to 13 illustrate an apparatus comprising a tower of large diameter packed with alternate layers of glass fibers sloping, respectively, outward and downward from the center, and inward and downward toward the center. This arrangement is particularly adapted for use where a relatively low rate of flow of the fluids is desired. The fibrous material is supported on baffle plates 21ª which may be similar to those shown in Figs. 7 and 8, and baffle plates 21ᵇ which slope downwardly and outwardly from the vertical center line of the tower to the walls thereof. The plates 21ª and 21ᵇ are arranged in alternation.

The glass fibers 40 which are supported on the plates 21ᵇ, are arranged to slope downwardly and outwardly substantially parallel with the supporting plate therebeneath. The fibers 40ª adjacent the walls of the tower may be arranged to slope downwardly and inwardly from the walls in a manner to deflect the fluids away from the wall and assist in directing the flow back toward the center of the tower. The fibers supported on the plates 21ª slope downwardly and inwardly. As shown in Fig. 13, the general direction of the fibers is radial to the tower, except that the fibers lying adjacent to the wall of the tower may extend in a generally circumferential direction.

It will be observed that with the fibrous material arranged in the manner shown in Figs. 11 to 13, as above described, the length of the path of travel of the fluids is materially increased as compared with the arrangements shown in the other views. Although it has heretofore often been attempted to obtain such a zigzag flow by merely baffling the fluids, the flow of liquid has never been satisfactory, since only by the use of the directed fibers can the flow of liquid through the mass of packing be properly controlled.

The supporting baffle plates 21ª and 21ᵇ provide a convenient means for supporting the fibrous material with the fibers arranged in a zigzag or alternately sloping path. It will be understood, however, that a similiar arrangement of the fibers for directing the fluids in a zigzag path might be employed without the use of the baffles or with the packing material supported on horizontal plates such as shown, for example, in Fig. 4.

Figs. 14 to 16 show an arrangement of packing suitable for a scrubbing tower. The packing material as herein shown consists essentially of horizontally disposed layers 42 of glass fibers. These fibers preferably have a diameter of two thousandths to ten thousandths inch. At the edges of the packing, next to the vertical shell of the tower, the fibers 42ª are preferably arranged in a generally circumferential direction and are also arranged to slope upward to a greater or less degree as they approach the wall. This causes any liquid flowing down the wall of the tower to be thrown inward into the body of the packing.

Finally, it is not necessary that any supporting plates or chambers be present in the tower, the various layers of fiber being laid one on top of the other, and completely fitting the tower. In this case suitable sizes and directions of fiber will be used in various parts of the tower to accomplish the desired results, in accordance with the general methods herein specified.

The various forms of apparatus herein shown and described indicate the broad utility of my invention, but the invention is not limited to the specific disclosures, since various modifications of the apparatus and methods herein disclosed may be resorted to within the spirit and scope of the invention.

I claim:

1. A gas and liquid contact apparatus comprising a tower, means dividing said tower into superposed chambers, means for introducing liquid into said chambers, mats of fibrous material within said chambers, each said mat extending transversely of the tower and having at least a portion of said mat embedded in said liquid, and means for causing a uniformly distributed flow of gas through said mats and said liquid from one chamber to another, said material consisting of glass fibers systematically arranged to provide an open porous mass and directionally control the flow of fluid therethrough.

2. A gas and liquid contact apparatus comprising a tower, means dividing said tower into superposed chambers, means for establishing predetermined, fixed levels of liquid in said chambers, said levels being spaced below the tops of the respective chambers, mats of fibrous material within said chambers, each said mat extending transversely of the tower and having at least a portion of said mat embedded in said liquid, and means for causing a flow of gas through said mats and said liquid from one chamber to another, the fibers comprising said mats being arranged to provide an even distribution of the gases over substantially the entire transverse area of the mats.

3. A gas and liquid contact apparatus comprising a tower, means dividing said tower into superposed chambers, means for establishing predetermined, fixed levels of liquid in said chambers, said levels being spaced below the tops of the respective chambers, mats of fibrous material within said chambers, each said mat extending transversely of the tower and having at least a portion of said mat embedded in said liquid, and means for causing a flow of gas through said mats and said liquid from one chamber to another, the fibers forming the marginal portions of each mat being arranged to deflect the fluids inwardly toward the center of the mat and thereby counteract the tendency of the fluids to flow along the walls of the tower.

4. A treating tower comprising an outer cylindrical shell, means dividing the tower into superposed chambers or compartments, layers of contact material in the respective compartments having at least a portion thereof embedded in a liquid, said material consisting of fibers forming an open, porous mass and systematically arranged to directionally control the flow of a fluid therethrough, means for causing an upward flow of gaseous material through said material and said liquid, and means for causing an even distribution of the gaseous flow through said contact material and said liquid.

5. A fractionating or scrubbing tower comprising a vertically disposed shell, a plurality of layers or mats of contact material within said shell having at least a portion thereof embedded in a liquid, said layers being arranged transversely of the shell, said material consisting of glass fibers providing an open porous mass, the fibers being arranged in a predetermined order to control the distribution and the general direction of flow of a gas through the mats and said liquid.

6. A fractionating or scrubbing tower comprising a vertically disposed shell, a plurality of layers or mats of contact material within said shell having at least a portion thereof embedded in a liquid, said layers being arranged transversely of the shell, said material consisting of glass fibers symmetrically arranged in a generally horizontal direction adapted to cause an intimate contact between said liquid and a gas passing through said liquid.

7. A fractionating or scrubbing tower comprising a vertically disposed shell, a plurality of layers or mats of contact material within said shell, said layers being arranged transversely of the shell and embedded in a liquid adapted to course through said contact material, said material consisting of glass fibers, the general directions of which are substantially radial to the shell to cause an even distribution of said liquid transversely of the tower.

8. A fractionating or scrubbing tower comprising a vertically disposed shell, a plurality of layers or mats of contact material within said shell and embedded in a liquid adapted to course through said contact material, said layers being arranged transversely of the shell, said material consisting of glass fibers, the fibers adjacent the wall of the tower being arranged in a downwardly and inwardly inclined direction to cause an even distribution of said liquid transversely of the tower.

9. A gas and liquid contact apparatus comprising a tower, means dividing said tower into superposed chambers, and mats of fibrous material within said chambers, each said mat extending transversely of the tower, each said mat comprising a web or strip of the fibrous material wound spirally to form a roll laterally coextensive with the interior of the tower.

10. A gas and liquid contact apparatus comprising a tower, means dividing said tower into superposed chambers, and mats of fibrous material within said chambers, each said mat extending transversely of the tower, each said mat comprising a web or strip of the fibrous material wound spirally to form a roll laterally coextensive with the interior of the tower, the individual fibers comprising said strip extending mainly in a direction transverse to the roll.

11. A gas and liquid contact apparatus comprising a tower, means dividing said tower into superposed chambers, and mats of fibrous material within said chambers, each said mat extending transversely of the tower, the fibers of alternate mats being outwardly and downwardly inclined, and the fibers of the intervening mats being inwardly and downwardly inclined.

12. A treating tower comprising a vertically disposed shell, baffle plates therein spaced at intervals lengthwise of the tower and separating it into a series of superposed chambers, each said baffle plate presenting a supporting surface, downwardly and inwardly inclined from the wall of the tower toward the center thereof, and mats of fibrous material overlying and covering said baffle plates, said mats consisting of glass fibers arranged to provide an open porous medium for the passage and distribution of fluids.

13. A treating tower comprising a vertically disposed shell, baffle plates therein spaced at intervals lengthwise of the tower and separating it into a series of superposed chambers, each said baffle plate presenting a supporting surface, downwardly and inwardly inclined from the wall of the tower toward the center thereof, and mats of fibrous material overlying and covering said baffle plates, said mats consisting of glass fibers arranged to provide an open porous medium for the passage and distribution of fluids, the fibers comprising said mats being arranged to slope downwardly and inwardly in directions approximately parallel with the underlying surfaces of the baffle plates.

14. A treating tower comprising a vertically disposed shell, a series of foraminous baffle plates extending transversely of the tower and arranged in vertically spaced relation, alternate plates of said series having their surfaces inclined inwardly and upwardly from the wall of the tower toward the center thereof and the intervening plates having their surfaces inclined downwardly and inwardly from the wall of the tower toward the center thereof, and mats of fibrous material overlying and supported by said plates, said material comprising glass fibers arranged to form an open porous mass.

15. A treating tower comprising a vertically disposed shell, a series of foraminous baffle plates extending transversely of the tower and arranged in vertically spaced relation, alternate plates of said series having their surfaces inclined inwardly and upwardly from the wall of the tower toward the center thereof and the intervening plates having their surfaces inclined downwardly and inwardly from the wall of the tower toward the center thereof, and mats of fibrous material overlying and supported by said plates, said material comprising glass fibers arranged to form an open porous mass, said fibers extending radially of the tower in directions approximately parallel with the underlying inclined surfaces of the plates on which they are supported.

16. A gas and liquid contact apparatus comprising a tower, means dividing said tower into superposed chambers, mats of fibrous material within said chambers, and having at least a portion of each of said mats embedded in said liquid, each said mat extending transversely of the tower, and means for causing a uniformly distributed flow of gases through said mats from one chamber to another, said material consisting of an open porous mass of glass fibers symmetrically arranged to directionally control the flow of fluid therethrough, and screens overlying said mats.

17. Apparatus for causing an intimate contact between a liquid and a gas, which comprises a layer of fibrous glass material embedded in a body of said liquid, and means for passing said gas through said body, said fibrous glass adapted to increase the surface area of contact between said liquid and said gas and cause an even distribution of said gas over substantially the entire body of liquid, the fibers of said material being substantially all arranged to assume substantial although not complete parallelism with a predetermined surface and thereby cause the flow of fluid to be influenced into the general direction of said surface and fibers.

18. A fractionating or scrubbing tower comprising a vertically disposed shell, means for establishing a plurality of pools of a scrubbing liquid within the tower with the surfaces of the pools at predetermined levels, said pools being substantially coextensive laterally with the interior of the shell and arranged one above another with intermediate spaces, layers or mats of contact material within said shell and individual to said pools, said layers being arranged transversely of the shell and embedded at least partially in the said pools, said material consisting of glass fibers arranged to provide an open porous mass, the fibers comprising said layers being arranged to cause an even distribution, transversely of the tower, of gases moving through the tower and the said liquid in a direction lengthwise of the tower.

ROBERT V. KLEINSCHMIDT.